2,888,452
Patented May 26, 1959

2,888,452

FAT-SOLUBLE AZO-DYESTUFFS

Max Schmid and Willy Mueller, Riehen, Switzerland, assignors to Ciba Limited, Basel, Switzerland, a Swiss firm No Drawing. Application July 18, 1955
Serial No. 522,824

Claims priority, application Switzerland July 23, 1954

4 Claims. (Cl. 260—163)

This invention provides new fat-soluble azo-dyestuffs which, for example, like the azo-compound of the formula

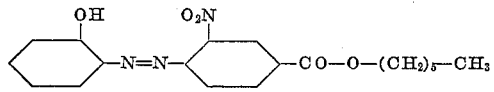

are free from sulfonic acid groups, and contain at least one hydroxyl group bound to the radical of the coupling component and at least one carboxylic acid ester group having a high molecular aliphatic or cycloaliphatic alcohol radical and also contain between the ester group and an azo linkage at least one aromatic 6-membered ring.

The expression "high molecular aliphatic alcohol" and the terms derived from this expression are used herein to denote compounds and radicals containing at least 5 carbon atoms.

The invention also provides a process for the manufacture of the above fat-soluble azo-dyestuffs, wherein a carboxylic acid halide which is free from sulfonic acid groups and contains an azo linkage, at least one hydroxyl group bound to the radical of a coupling component and at least one aromatic 6-membered ring between at least one carboxylic acid halide group and an azo linkage, is esterified with a high molecular aliphatic or cycloaliphatic alcohol.

The dyestuffs of the constitution defined above can also be made by treating a carboxylic acid which is free from sulfonic acid groups and contains at least one azo linkage and at least one hydroxyl group bound to the radical of a coupling component, or a functional derivative of such acid which contains a functionally converted carboxylic acid group of low molecular weight (i.e. containing at most 5 carbon atoms), especially a carboxylic acid ester group, and above all a carboxylic acid halide group and contains at least one aromatic 6-membered ring between at least one carboxylic acid group, which may be functionally converted, and an azo linkage, in such manner as to convert the aforesaid carboxylic acid group into a carboxylic acid ester group having a high molecular aliphatic or cycloaliphatic alcohol radical.

Accordingly, there come into consideration as starting materials, for example, the carboxylic acids themselves or carboxylic acid esters having low molecular alcohol radicals, for example, carboxylic acid methyl or ethyl esters, and as stated above, especially carboxylic acid halides.

The carboxylic acid halides are obtained by treating the carboxylic acids with an acid-halogenating agent. As acid-halogenating agents, that is to say, agents capable of converting carboxylic acids into their carboxylic acid halides, there may be used, for example, phosphorus halides, such as phosphorus pentabromide, phosphorus trichloride, phosphorus pentachloride or phosphorus oxyhalides. Advantageously there are used acid-chlorinating agents such, for example as phosphorus pentachloride and especially thionyl chloride.

The treatment of the carboxylic acids with such acid-halogenating agents is advantageously carried out in an inert organic solvent, such as a chlorobenzene, for example, mono- or di-chlorobenzene, toluene, xylene, benzene or nitrobenzene.

In making such acid halides it is usually of advantage first to dry azo-compounds which have been prepared in an aqueous medium or to free them from water azeotropically by boiling them in an organic solvent. This azeotropic drying may, if desired, immediately precede the treatment with an acid-halogenating agent.

The carboxylic acids containing an azo-linkage, which are used as starting materials for making the acid halides, may contain one or two, or if desired more than 2, carboxylic acid groups. The carboxylic acid group may be present in the radical of a diazo-component or of a coupling component, and the hydroxyl group, may be present, for example, in para-position to an azo linkage (this is the case when the azo-compound containing a carboxylic acid group is obtained by coupling a diazo-compound with an oxyaryl-compound capable of coupling in para-position to the hydroxyl group) or in a position vicinal to an azo linkage. This condition is fulfilled whenever in making an azo-dyestuff coupling takes place in ortho-position to an aromatically bound hydroxyl group or at the —CH$_2$— group of a heterocyclically bound or open-chain enolizable keto-methylene grouping, it being generally recognized that dyestuffs so obtained are in the enolized form. In accordance with the invention there are used azo-carboxylic acids, which contain, in addition to the carboxyl groups to be converted into acid halide groups, no groups imparting solubility, for example, sulfonic acid groups.

As types of such azo-carboxylic acids there may be mentioned, for example:

I. Products obtained by coupling diazo-compounds (including diazo-azo-compounds) with oxyaryl-carboxylic acids capable of coupling in ortho-position to the hydroxyl group, such as the dyestuffs of the formulae

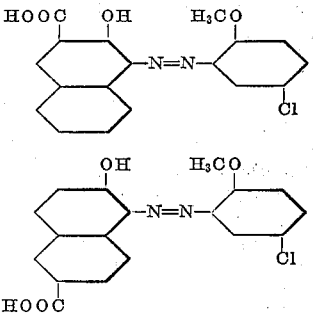

and

II. Products obtained by coupling diazo-compounds with heterocyclic carboxylic acids capable of coupling in a position vicinal to an enolized keto group, such as the dyestuff of the formula

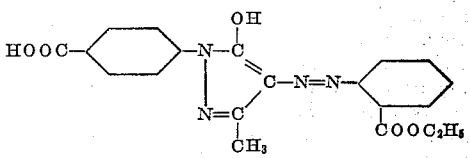

III. Products obtained by coupling any desired diazo-compounds with acylacetylaminoaryl-carboxylic acids, such as the dyestuff of the formula

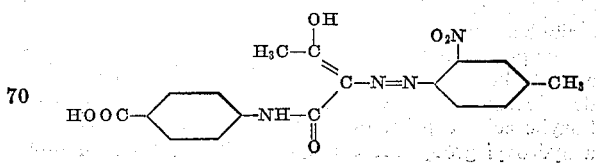

IV. Products obtained by coupling diazo-compounds containing carboxyl groups with any desired compounds capable of coupling in ortho-position to an aromatic hydroxyl group or an enolized keto group, such as the dyestuffs of the formulae

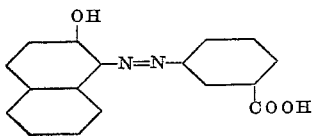

and

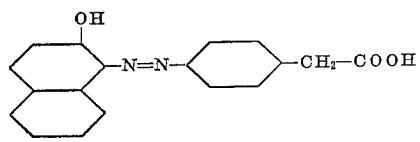

Further types are obtained by combining the characteristics of various of the types mentioned above or by modifying these characteristics in accordance with the general statements given above. Such types are more especially di- and poly-carboxylic acids containing azo linkages, for example, the compound of the formula

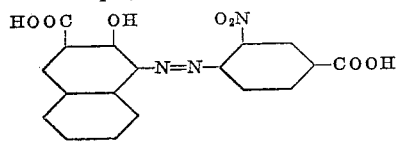

The following remarks apply to the individual types referred to above:

With regard to types I, II and III:

The diazo-compounds used for preparing these starting materials may belong to the benzene series or the naphthalene series or, if desired, may contain the diazo group bound to a polynuclear radical. It is generally of advantage to use diazo-compounds which are ordinarily suitable for the manufacture of ice colors. As examples there may be mentioned the following monamines containing only one benzene nucleus:

Monochloraminobenzenes, or dichloraminobenzenes such as 2-, 3- and 4-chloro-1-aminobenzene, aminobenzenes containing several different substituents such as 2-methyl- or 2-methoxy-5-nitro-1-aminobenzene, 2-methyl-3- or -4- or -5- or -6-chloro-1-amino-benzene, 2-nitro-4-chloro- or -4-methyl- or -4-methoxy-1-aminobenzene, 2-methoxy-5-methyl-1 - aminobenzene, 2:5-dimethoxy-4-chloro - 1 - aminobenzene and 4-chloro-2:5-dimethyl-1-aminobenzene. In an analogous manner there may be used monamines of the benzene series, which contain more than one benzene nucleus, such as 2-amino-4:4'-dichlorodiphenyl ether, 2-amino-diphenyl sulfone, 1-amino-2:5-dialkoxy-(especially methoxy or ethoxy)-4-benzoylaminobenzene, 1-amino-2-alkoxy-(for example, -methoxy)-4-benzoylamino-5-methylbenzene, aminochrysene, aminopyrene, 4-amino-2-methyl-5-methoxy-1 - benzoylaminobenzene, 4-amino-2':3'-dimethyl - 1:1' - azobenzene, 4-amino-2:5-dimethoxy-4'-nitro-2':6'-dichloro - 1:1' - azobenzene, aminodiphenylamines or N-substitution products thereof. There also come into consideration amines containing trifluoromethyl groups, such as 4-chloro-2-trifluoromethyl-aniline, 3:5-di-(trifluoromethyl)-aniline and 2-chloro-5-trifluoromethylaniline. Finally, there may be mentioned amines which also contain alkyl-sulfone, aralkyl-sulfone or sulfonic acid amide groups, such as 2-methoxy-5-ethyl-sulfone-aniline, 2-methoxy-5-benzyl-sulfone-aniline, 2-methoxy-1-aminobenzene-5-sulfonic acid diethylamide and 2-ethyl-sulfone-5-trifluoromethyl - 1-aminobenzene.

For preparing the carboxylic acids containing azo linkages, to be used as starting materials, amines of the kind described above or other amines are coupled with carboxylic acids capable of coupling in a position vicinal to a hydroxyl group, for example, with 2-hydroxynaphthalene-3-carboxylic acid, hydroxy-carbazole carboxylic acids, especially 2-hydroxy-carbazole-3-carboxylic acid and its N-alkyl derivatives, 2-hydroxyanthracene-3-carboxylic acid, and also 3-hydroxy-diphenylene oxide-2-carboxylic acids and 3-hydroxydiphenylene sulfide-2-carboxylic acids. As coupling components there may be used open chain or heterocylic compounds containing an enolizable keto group, in the case of which it is generally recognized that the enol form is present after coupling, that is to say, a hydroxyl group is present in a position vicinal to the azo linkage. As examples there may be mentioned aryl-pyrazolones which contain a carboxyl group in the aryl radical, for example, 1-phenyl-3-methyl-5-pyrazolone-4'-carboxylic acid, and also carboxyl-containing arylides of β-keto-carboxylic acids, for example, 1-acetoacetyl-aminobenzene-2- or -3- or -4-carboxylic acid and 1-benzoyl-acetylaminobenzene-3- or -4-carboxylic acid.

With regard to type IV:

Carboxylic acids of the kind mentioned above and containing azo linkages can be made in another manner, namely by coupling a diazotized aminoaryl-carboxylic acid with a coupling component capable of coupling in ortho-position to a hydroxyl group. As examples there may be mentioned aminobenzoic acids and halogen-, alkoxy- and nitro-derivatives thereof, and also alkyl-sulfones thereof. These diazo-compounds may be coupled with any desired compounds capable of coupling in a position vicinal to a hydroxyl group, such as 2-hydroxy-naphthalene, 1-hydroxybenzenes or 1-hydroxynaphthalenes substituted in the 4-position, 2- or 3-hydroxycarbazoles such as N-methyl-3-hydroxycarbazole, and 3-hydroxydiphenylene oxide.

In addition to the monocarboxylic acids containing azo-linkages described above, there may be used as starting materials for making the acid halides compounds which contain more than one carboxylic acid group. Such compounds can be obtained by coupling any desired diazo compounds with dicarboxylic acids containing hydroxyl groups and capable of coupling, or by coupling diazo-compounds containing two carboxylic acid groups with compounds capable of coupling, or more especially by coupling diazotized aminoaryl-carboxylic acids with compounds containing carboxylic acid groups and capable of coupling, for example, by coupling a diazotized aminobenzoic acid with 2-hydroxynaphthalene-3-carboxylic acid, with a pyrazolone carboxylic acid or with a β-keto-carboxylic acid arylamide, which contains a carboxylic acid group in the aryl radical, or with 4-methyl-1-hydroxybenzene-2-carboxylic acid or with α- or β-resorcyclic acid.

The aliphatic or cycloaliphatic alcohols used as starting materials for making the fat-soluble azo-dyestuffs contain 5 up to, for example, 18 or more carbon atoms. The chain of the aliphatic alcohol may be straight or branched. There may be used primary, secondary or tertiary unsaturated alcohol (for example, containing a single ethylene bond) or advantageously saturated alcohol. For some purposes, especially when water-repellent dyestuffs are desired, it is of advantage to react with the carboxylic acid halide an alcohol containing at least 8 carbon atoms. If desired, di-alcohols may be condensed with the acid halides, and the condensation may, for example, be carried out also in the molecular ratio 1:2.

The conversion of the carboxylic acid halides into the carboxylic acid esters of the kind described above does not involve any difficulty. As a solvent or dispersion medium in which to carry out this reaction it is generally advantageous to use an excess of the alcohol which is to be reacted with the acid halide. The reaction sets in easily at a raised temperature, for example, at about 100–150° C., and can usually be completed within a few hours, and as a rule it is not necessary to add an acid-binding agent. When the greater part of the resulting ester does not crystallize from the reaction mixture on cooling, the ester can generally be precipitated to a considerable extent in the cold by the addition of an alcohol of low molecular weight such as methanol or ethanol.

In a modification of the process described above the fat-soluble azo-dyestuffs of the above constitution are made by coupling a diazo-compound free from sulfonic acid groups with a coupling component free from sulfonic acid groups and containing a hydroxyl group, at least one of the starting materials containing an aromatically bound carboxylic acid ester group having an aliphatic or cycloaliphatic radical of high molecular weight and at least one 6-membered aromatic ring.

Provided that the necessary diazo-components and coupling components are available, the possibilities described in connection with the production of carboxylic acids containing azo linkages (see especially I–IV above) apply to this method of making the dyestuffs, except that in this case the components must contain, instead of carboxylic acid groups, carboxylic acid ester groups having aliphatic or cycloaliphatic alcohol radicals of high molecular weight. These starting materials can be made by methods in themselves known. Diazo-components can be made, for example, by esterifying nitro-aryl carboxylic acids with alcohols of high molecular weight, and then reducing the nitro group to the amino group.

The new dyestuffs are generally distinguished by their good fastness to light and sublimation, and these properties are obviously of great advantage for all purposes. Furthermore, as stated above, they dissolve well or very well in practically all the usual organic solvents, for example, in alcohols such as methanol or ethanol, in acetone, dioxane, dimethyl-formamide, and especially in hydrocarbons such as benzene, benzine of various qualities, tetralin, halogen benzenes, aliphatic halogen-compounds such as carbon tetrachloride or trichlorethylene, amyl acetate and cellulose ester lacquers.

The dyestuffs are therefore suitable for dyeing a very wide variety of materials, especially those of hydrophobic nature. Especially fats and waxes, and also products made with these substances, can be dyed with the new dyestuffs. In this connection, the dyestuffs have proved to be very well absorbed and extremely fast to sublimation. As products to be dyed there may be mentioned in this connection:

Floor and wood treating preparations, such as floor polish, floor stain, wood stain, furniture polish; candles and other articles of wax or similar substances; inks, printing colors, writing or marking pencils, for example, intaglio printing inks, inks for copying written matter, stamping inks, inking ribbons, transfer papers, crayons; and cosmetic articles, for example, make-up colors, lipsticks and nail varnish. These dyestuffs are also very well suited for coloring artificial masses and lacquers, for example, nitrocellulose ester lacquers. In this manner there are obtained transparent lacquers and lacquer coatings which are fast to light.

The above mentioned solutions of the dyestuffs in organic solvents, advantageously those of low boiling point such as benzene or benzine, can also be used for impregnating substances of fibrous character such as textiles, leather, artificial leather or paper. By virtue of their good solubility they can be made up, for example, into concentrated stock solutions suitable for coloring fuels such as benzine. When the dyestuffs contain alcohol radicals having about 8 or more than 8 carbon atoms they possess, in addition to their dyeing or coloring character, the water-repellent property referred to above.

Furthermore, the new dyestuffs are suitable for dyeing spinning masses, especially those of acetyl-cellulose, in which the dyestuffs are likewise easily soluble, which is advantageous in that, as compared with coloring matters insoluble in spinning masses, no special measures are necessary for producing a fine dispersion and few troubles can arise.

Finally, the dyestuffs are well suited for printing flat structures (if desired, the entire surface may be provided with a colored layer), when they are incorporated into suitable artificial resin printing pastes and the material is printed therewith. Thus, there may be used for example, as a binding agent a hardenable mixture which contains as essential ingredients an ethyleneoxy derivative of an hydroxy-compound containing at least two hydroxyl groups, for example, a condensation product of a di-(hydroxyphenyl)-alkane with epichlorhydrin or glycerine dichlorohydrin, and also a hardening agent, for example, a compound containing at least two amino groups.

The following examples illustrate the invention, the parts and percentages being by weight unless otherwise stated and the relationship of parts by weight to parts by volume being the same as that of the kilogram to the liter:

EXAMPLE 1

33.7 parts of the azo dyestuff from diazotized 3-nitro-4-aminobenzoic acid and 2-hydroxynaphthalene are stirred in 250 parts of dry chlorobenzene with 15 parts of thionyl chloride. The whole is heated to 120–130° C. until a clear solution is obtained and the evolution of hydrogen chloride has practically ceased, which is the case after about 3 hours. Upon cooling, the dyestuff acid chloride of the formula

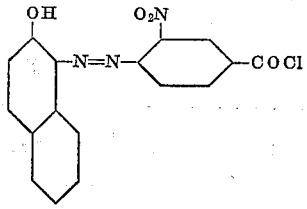

crystallizes out in the form of lustrous orange-brown crystals. The latter are separated by filtering with suction, washed with chlorobenzene, and dried in vacuo at 60–70° C. When recrystallized from chlorobenzene the acid chloride melts at 226–228° C.

35.5 parts of the acid chloride are introduced into 150 parts of n-hexyl alcohol, and the mixture is slowly heated to 120–130° C. At about 100° C. the evolution of hydrogen chloride gas sets in, and after a short time a clear orange solution is formed. The whole is stirred for 6 hours at 120–130° C., at the end of which the evolution of hydrogen chloride has practically ceased. The mixture is then cooled to 10–15° C., whereupon the dyestuff separates out in handsome orange crystals. The latter are filtered off and washed with ethyl alcohol. When recrystallized from ethyl alcohol the dyestuff of the formula

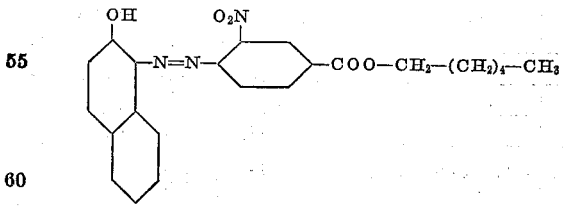

crystallizes in handsome orange crystals melting at 98–100° C. The dyestuff is insoluble in water, and it dissolves in all the usual organic solvents with an orange coloration. The dyestuff dissolves especially easily in hydrocarbons such as benzine, benzene, Tetralin, and also esters, ethers and chlorinated hydrocarbons such as carbon tetrachloride, tetrachlorethane, trichlorethylene and the like. In fats and waxes it produces pure orange colorations which are fast to sublimation and are of good fastness to light. The dyestuff is also suitable for dyeing lacquers and artificial substances and also for dyeing benzine. In this example the n-hexyl alcohol may be replaced by any desired aliphatic or hydroaliphatic alcohol containing at least 5 carbon atoms. In the following table are given a few alcohols suitable for the esterification and the melting points of the dyestuffs obtained therefrom.

Table I

| | Esterifying alcohol | Melting point (uncorrected), degrees |
|---|---|---|
| 1 | Primary n-amylalcohol | 102–104 |
| 2 | n-hexyl alcohol | 98–100 |
| 3 | n-heptyl alcohol | 83–89 |
| 4 | isooctyl alcohol | 48–50 |
| 5 | n-nonyl alcohol | 71–73 |
| 6 | 2-ethyl hexyl alcohol | 82–83 |
| 7 | n-dodecyl alcohol | 35–40 |
| 8 | n-cetyl alcohol | 70–72 |
| 9 | cetyl-stearyl alcohol | 68–71 |
| 10 | stearyl alcohol | 76–78 |
| 11 | oleyl alcohol | wax-like 40 |

Those dyestuff esters which contain an alcohol residue having at least 8 carbon atoms, exhibit a hydrophobic character, that is to say, the dyestuffs and materials dyed or impregnated with them possess water-repellent properties.

In the following table are given further dyestuffs which can be made in the manner described in this example.

trate is allowed to cool. The precipitated crystals of the acid chloride of the formula

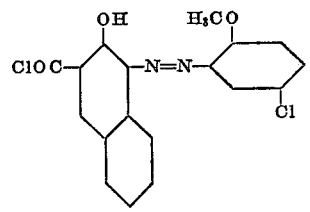

having a bronze lustre are filtered off with suction, washed with chlorobenzene, and dried in vacuo at 60–65° C.

18.75 parts of the dyestuff acid chloride so obtained are introduced at 80° C., while stirring, into 80 parts of nonyl alcohol. The suspension so obtained is then slowly heated to 130–140° C.

Dissolution occurs at 100–110° C. with the strong evolution of hydrochloric acid. The whole is heated for 4 hours at 130–140° C. At the end of this period practically no more hydrochloric acid is evolved. The whole is allowed to cool to 60° C. and diluted with 80 parts of

Table II

| | Coupling Component | Diazo-Component | Esterifying Alcohol | Color of solution in benzene |
|---|---|---|---|---|
| 1 | 2-Hydroxynaphthalene | m-aminobenzoic acid | isopropyl alcohol | yellow orange. |
| 2 | do | p-aminobenzoic acid | primary isoheptyl alcohol. | orange. |
| 3 | do | 4-chloro-3-aminobenzoic acid | nonyl alcohol | yellow orange. |
| 4 | do | 4-methoxy-3-aminobenzoic acid. | do | red orange. |
| 5 | 6-bromo-2-hydroxynapthalene | 4-chloro-3-aminobenzoic acid | cyclohexanol | scarlet. |
| 6 | do | 4-methoxy-3-aminobenzoic acid. | n-dodecyl alcohol | red. |
| 7 | do | p-aminobenzoic acid | nonyl alcohol | red orange. |
| 8 | 6-methoxy-2-hydroxynaphthalene. | do | do | red. |
| 9 | do | 4-methoxy-3-aminobenzoic acid. | do | bluish red. |
| 10 | 6-methyl-2-hydroxynaphthalene. | do | do | red. |
| 11 | 6-bromo-2-hydroxynaphthalene. | 2-aminobenzoic acid | do | red orange. |
| 12 | 5:8-dichloro-1-hydroxynaphthalene. | 4-methoxy-3-aminobenzoic acid. | do | bluish red. |
| 13 | 5:8-dichloro-1-hydroxynaphthalene. | p-aminobenzoic acid | do | red. |
| 14 | 1-hydroxynaphthalene | do | do | yellowish red. |
| 15 | 2-hydroxynaphthalene | p-aminophenylacetic acid | n-heptyl alcohol | orange. |
| 16 | do | 1-methyl-2-aminophenyl acetic acid. | stearyl alcohol | red. |
| 17 | do | 4-methoxy-3-aminophenyl-acetic acid. | cetyl alcohol | bluish red. |
| 18 | do | 4-methyl-2-aminophenoxy-acetic acid. | cetyl-stearyl alcohol | red. |
| 19 | do | 4-chloro-2-amino-phenoxy-acetic acid. | nonyl alcohol | Do. |
| 20 | do | 4′-chloro-2-aminodiphenyl ether-3-carboxylic acid. | do | Do. |
| 21 | 6-bromo-2-hydroxynaphthalene. | 4-methoxy-3-aminophenyl acetic acid. | do | Do. |

EXAMPLE 2

35.6 parts of the dyestuff from diazotized 2-amino-4-chloro-1-methoxybenzene or 2-hydroxynaphthalene-3-carboxylic acid are stirred in 500 parts by volume of dry chlorobenzene. 15 parts of thionyl chloride are added and the whole is slowly raised to the boil. Boiling is continued under reflux until appreciable quantities of hydrogen chloride are no longer evolved, which is the case after 5–6 hours. The mixture is then filtered hot to remove small amounts of insoluble products, and the filtrate ethyl alcohol. It is then cooled to 10° C., whereupon the dyestuff ester of the formula

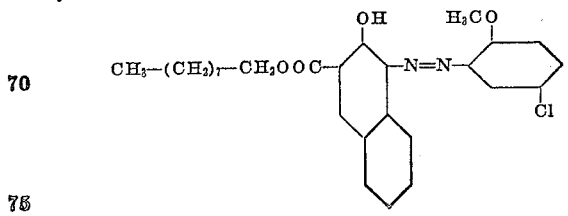

separates out in the form of handsome red crystals. The crystals are separated by filtering with suction, washed with cold alcohol and dried in vacuo at 40–50° C. The dyestuff is obtained in the form of lustrous red lamellae melting at 181–183° C. It dissolves easily in all organic solvents with a scarlet red coloration. It dyes fats and waxes brilliant scarlet red tints of very good fastness to sublimation.

In the following table are given a few further dyestuffs which can be made by the procedure described in this example.

Table III

| | Coupling Component | Diazo-Component | Esterifying Alcohol | Color of solution in benzene |
|---|---|---|---|---|
| 1 | 2-hydroxynaphthalene-3-carboxylic acid. | 1-methyl-2-amino-4-chlorobenzene. | heptyl alcohol | scarlet. |
| 2 | ----do---- | 1-methyl-3-amino-4-methoxybenzene. | nonyl alcohol | red. |
| 3 | ----do---- | 2-nitro-4-chloro-1-aminobenzene. | dodecyl alcohol | orange. |
| 4 | ----do---- | 2:4-dichloro-1-aminobenzene | cetyl alcohol | Do. |
| 5 | ----do---- | 1-methyl-2-amino-5-methoxybenzene. | nonyl alcohol | bluish red. |
| 6 | ----do---- | 4-nitro-2-methoxy-1-aminobenzene. | ----do---- | red. |
| 7 | ----do---- | 2-aminobenzoic acid methyl ester. | ----do---- | yellowish red. |
| 8 | ----do---- | 2-aminobenzoic acid ethyl ester. | ----do---- | Do. |
| 9 | ----do---- | 2-amino-5-chloro-benzoic acid diethylamide. | ----do---- | scarlet. |
| 10 | ----do---- | 2-chloro-5-methyl-4-cyanoaniline. | ----do---- | orange red. |
| 11 | ----do---- | 2-methyl-5-chloro-1-aminobenzene. | ----do---- | scarlet. |
| 12 | ----do---- | 2-methoxy-5-methyl-1-aminobenzene. | ----do---- | red. |
| 13 | ----do---- | 2-nitro-4-chloro-1-amino-benzene. | ----do---- | orange. |
| 14 | ----do---- | 2-methyl-4-methoxy-1-aminobenzene. | ----do---- | red. |
| 15 | ----do---- | 4-methyl-1-aminobenzene | ----do---- | yellowish red. |
| 16 | ----do---- | 4'-aminophenyl-1:1'-azobenzene. | ----do---- | corinth. |
| 17 | ----do---- | 4-chloro-2-amino-1:1'-azobenzene. | ----do---- | bluish red. |
| 18 | 2-hydroxycarbazole-3-carboxylic acid. | 1-amino-2-methyl-4-chlorobenzene. | dodecyl alcohol | violet brown. |
| 19 | ----do---- | 1-amino-3-chlorobenzene | isobutyl alcohol | olive. |
| 20 | 2-hydroxydiphenylene-oxide-3-carboxylic acid. | 1-amino-2-methyl-5-chloro-benzene. | nonyl alcohol | brown. |
| 21 | ----do---- | 1-amino-2-methyl-4-chlorobenzene. | ----do---- | Do. |

Those dyestuff esters which contain an alcohol residue having at least 8 carbon atoms possess hydrophobic properties, that is to say, the dyestuff and materials dyed or impregnated therewith possess water-repellent properties.

EXAMPLE 3

38.1 parts of the dyestuff from diazotized 3-nitro-4-aminobenzoic acid and 2-hydroxynaphthalene-3-carboxylic acid are stirred in 150 parts of nitrobenzene at 120° C. In 2 hours 30 parts of thionyl chloride are introduced dropwise, while stirring, and the whole is heated at 140–145° C. until the evolution of hydrochloric acid ceases. There is obtained a clear orange colored solution, from which, on cooling, the dyestuff acid chloride of the formula

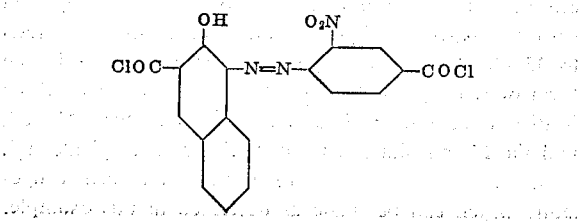

separates in the form of orange-red needles melting at 203° C. (with decomposition). The crystals are filtered off, freed from nitrobenzene by washing with benzene and dried in vacuo at 50–60° C.

41.8 parts of the acid chloride so obtained are introduced at 90–100° C. into 120 parts of nonyl alcohol. The chloride dissolves with a strong evolution of hydrochloric acid. The whole is heated for 4 hours, at 130–140° C., then allowed to cool to 60° C. and diluted with 100 parts of ethyl alcohol. From the solution, which is at first clear, the dyestuff ester of the formula

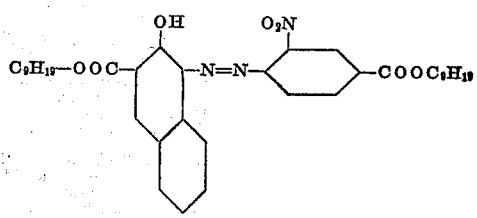

separates on cooling in the form of handsome orange-red crystals.

The dyestuff is soluble in all organic solvents. It dissolves especially well in benzene hydrocarbons, in ethers and esters and also in benzene hydrocarbons. It dyes fats and waxes brilliant orange tints of excellent fastness to sublimation. The dyestuff is of strongly hydrophobic character, that is to say, the dyestuff itself and materials dyed or impregnated therewith are water-repellent.

In the following table are given a few further dyestuffs which can be made by the procedure described in this example:

Table IV

| | Coupling Component | Diazo-Component | Esterifying Alcohol | Color of solution in benzene |
|---|---|---|---|---|
| 1 | 2-hydroxynapthalene-3-carboxylic acid. | p-aminobenzoic acid | amyl alcohol | red orange. |
| 2 | ----do---- | m-aminobenzoic acid | ----do---- | Do. |
| 3 | ----do---- | 4-chloro-3-aminobenzoic acid. | cetyl-stearyl alcohol | orange. |
| 4 | ----do---- | 4-methoxy-3-aminobenzoic acid. | nonyl alcohol | scarlet. |
| 5 | ----do---- | 4-methoxy-3-aminophenyl-acetic acid. | n-hexyl-alcohol | red. |
| 6 | ----do---- | 4-chloro-2-aminophenoxy-acetic acid. | dodecyl alcohol | yellowish red. |
| 7 | ----do---- | 4-amino-2:5-dimethoxy-1:1'-azobenzene-3'-carboxylic acid. | nonyl alcohol | violet. |
| 8 | ----do---- | 5-methoxy-4-amino-2-methyl-1:1'-azobenzene-3'-carboxylic acid. | ----do---- | red violet. |
| 9 | 2-hydroxynaphthalene-7-hydroxyacetic acid. | p-aminobenzoic acid | heptyl alcohol | orange. |
| 10 | 2-hydroxynaphthalene-6-hydroxyacetic acid. | m-aminobenzoic acid | nonyl alcohol | red orange. |
| 11 | 2-hydroxynaphthalene-3-carboxylic acid anilide-3'-carboxylic acid. | ----do---- | ----do---- | Do. |
| 12 | ----do---- | 3-amino-4-methoxy-1-benzoic acid. | stearyl alcohol | red. |

EXAMPLE 4

47.5 parts of the dyestuff from diazotized 4-chloro-3-amino-1-benzoic acid and 2-hydroxynaphthalene-3-carboxylic acid-2'-methoxy-phenylamide are stirred in 500 parts of dry nitrobenzene with 15 parts of thionyl chloride. The mixture is slowly heated to 110–120° C., the majority of the dyestuff dissolving with strong evolution hydrogen chloride. The whole is stirred at 110–120° C. until practically no more hydrochloric acid escapes, it is filtered off with suction, freed from nitrobenzene by washing with benzene and dried at 50–60° C. The chloride is obtained in the form of small handsome red needles.

49.4 parts of the dyestuff acid chloride obtained as described above are introduced at 110° C. into 120 parts of stearyl alcohol. The chloride dissolves with foaming and the strong evolution of hydrochloric acid. The whole is heated for 6 hours at 140–145° C. At the end of this

Table V

| | Coupling Component | Diazo-Component | Esterifying Alcohol | Color of solution in benzene |
|---|---|---|---|---|
| 1 | 2-hydroxynaphthalene-3-carboxylic acid phenylamide. | p-aminobenzoic acid | nonly alcohol | red orange. |
| 2 | ----do---- | 4-chloro-4-aminobenzoic acid | ----do---- | orange. |
| 3 | 2-hydroxynaphthalene-3-carboxylic acid-2'-methylphenylamide. | m-aminobenzoic acid | dodecyl alcohol | scarlet. |
| 4 | 2-hydroxynaphthalene-3-carboxylic acid-2'-methoxyphenylamide. | 4-methoxy-3-aminobenzoic acid | ----do---- | red. |
| 5 | 2-hydroxynaphthalene-3-carboxylic acid 2'-chlorophenylamide. | 4-chloro-3-aminobenzoic acid | nonyl alcohol | orange. |
| 6 | 2-hydroxynaphthalene-3-carboxylic acid-4'-methylphenylamide. | 4-methoxy-3-aminophenoxy-acetic acid | ----do---- | red. |
| 7 | 2-hydroxynaphthalene-3-carboxylic acid cyclohexylamide. | p-aminobenzoic acid | ----do---- | red orange. |
| 8 | ----do---- | 4-methoxy-3-aminophenoxy-acetic acid | ----do---- | red. |
| 9 | 2-hydroxynaphthalene-3-carboxylic acid-2'-ethoxyphenylamide. | ----do---- | ----do---- | bluish red. |
| 10 | 1-hydroxynaphthyl-(4)-phenyl-ketone. | 4-methoxy-3-aminobenzoic acid | ----do---- | red. |
| 11 | ----do---- | ----do---- | cetyl alcohol | bluish red. |
| 12 | ----do---- | 4-methoxy-3-aminophenyl-acetic acid | ----do---- | red. |
| 13 | 2-hydroxynaphthalene-3-carboxylic acid-2'-methoxyphenylamide. | 4-chloro-3-aminobenzoic acid | oleyl alcohol | Do. |
| 14 | ----do---- | ----do---- | nonyl alcohol | Do. | then cooled and the precipitated dyestuff acid chloride of the formula

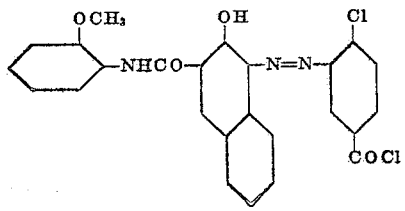

period the evolution of hydrochloric acid practically ceases. The mixture is cooled to 80° C. and diluted with 150 parts of ethyl alcohol. The temperature falls to 35–40° C., and the dyestuff ester crystallizes in the form of red crystals having a bronze lustre. The whole is stirred for a short time at room temperature, filtered, and the filter residue is washed with cold ethyl alcohol.

In the preceding table are given a few further dyestuffs which can be made as described in this example.

After being dried in vacuo at 50-60° C., the dyestuff of the formula

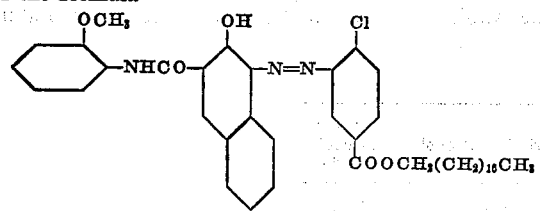

is obtained in the form of handsome lustrous red crystals, which dissolve in benzene and other organic solvents with a red coloration. It is suitable for dyeing fats, waxes, lacquers and artificial masses. The dyestuff has a hydrophobic character, so that materials dyed or impregnated therewith are water-repellent.

EXAMPLE 5

40.45 parts of the dyestuff from diazotized 3-nitro-4-amino-benzoic acid and 1-acetoacetylamino-2-chlorobenzene are stirred in 500 parts of dry chlorobenzene with 15 parts of thionyl chloride and heated at 120-130° C. until the evolution of hydrochloric acid ceases. After cooling the mixture, the dyestuff acid chloride of the formula

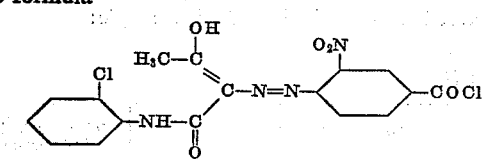

which separates in a crystalline form, is filtered off with suction, washed with cold chlorobenzene and dried in vacuo at 60-70° C. After recrystallization from chlorobenzene the chloride melts at 261-262° C. with partial decomposition.

44.4 parts of the acid chloride so obtained are introduced at 89-90° C. into 200 parts of n-heptyl alcohol. The whole is then heated to 130-140° C., whereupon the chloride dissolves with the strong evolution of hydrochloric acid. After 3 hours the evolution of hydrochloric acid ceases. The whole is allowed to cool and the crystalline dyestuff ester is filtered off with suction, washed with methyl alcohol and dried in vacuo at 50-55° C. There is obtained the dyestuff ester of the formula

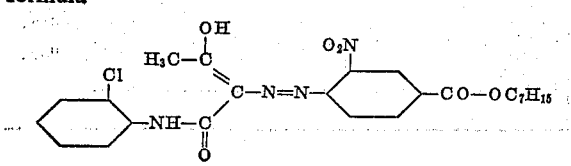

in the form of a greenish yellow powder, which dissolves easily in all organic solvents. This dyestuff dyes fats and waxes pure greenish yellow tints of good fastness to sublimation.

Those dyestuffs, which contain one or two alcohol residues together having 10 carbon atoms, possess hydrophobic properties.

In the following table are given a few further dyestuff esters obtainable by the procedure of this example:

Table VI

| | Coupling Component | Diazo-Component | Esterifying Alcohol | Color of solution in benzene |
|---|---|---|---|---|
| 1 | 1-acetoacetyl-amino-2-methoxy-4-chloro-5-methylbenzene. | 4-chloro-3-amino-benzoic acid | amyl alcohol | yellow. |
| 2 | ...do... | 4-methoxy-3-amino-benzoic acid. | nonyl alcohol | reddish yellow. |
| 3 | 4-acetoacetylaminobenzoic acid | 3-nitro-4-amino-toluene | ...do... | greenish yellow. |
| 4 | 4-acetoacetylaminophenylacetic acid. | ...do... | ...do... | Do. |
| 5 | 4-chloro-2-aceto-acetylaminopehn-oxyacetic acid. | 2-nitro-4-methoxy-1-amino-benzene. | cetyl alcohol | yellow. |
| 6 | 3-acetoacetyl-amino-4-methoxy-phenylacetic acid. | ...do... | dodecyl alcohol | reddish yellow. |
| 7 | 4-acetoacetyl-aminobenzoic acid | 3-nitro-4-amino-benzoic acid | nonyl alcohol | greenish yellow. |
| 8 | 4-chloro-3-aceto-acetylaminobenzoic acid. | ...do... | n-hexyl alcohol | Do. |
| 9 | 4-methoxy-3-aceto-acetylamino-benzoic acid. | ...do... | heptyl alcohol | yellow. |
| 10 | 4-acetoacetyl-aminobenzoic acid | 4-amino-5-methoxy-2-methyl-phenylazo-2'-chlorobenzene-5'-carboxylic acid. | nonyl alcohol | orange. |

EXAMPLE 6

41.1 parts of the dyestuff from diazotized 3-nitro-4-aminobenzoic acid and 1-phenyl-3-methyl-5-pyrazolone-4'-carboxylic acid are heated at 110° C. in 400 parts of toluene with 30 parts of thionyl chloride until the evolution of hydrochloric acid ceases. The dyestuff acid chloride of the formula

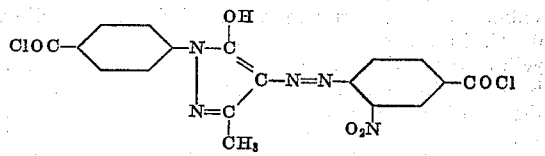

separates from the clear solution on cooling in the form of handsome yellow-orange needles. After recrystallization from toluene or chlorobenzene the dyestuff melts at 240-247° C.

44.8 parts of the acid chloride so obtained are introduced at 80° C. into 150 parts of nonyl alcohol. The chloride dissolves with foaming and the splitting off of hydrogen chloride. After heating the mixture at 120-130° C. until the evolution of hydrogen chloride ceases, the whole is allowed to cool to 60° C. and the solution is diluted with 150 parts of methyl alcohol. The mixture is then cooled to 5-10° C., whereupon the dyestuff ester crystallizes in the form of yellow lustrous lamellae. It is filtered off with suction, washed with cold methyl alcohol and dried in vacuo at 40-50° C. The new dyestuff of the formula

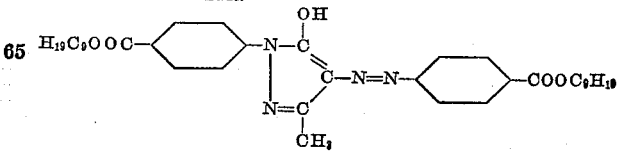

is a yellow crystalline powder, which dissolves easily in all organic solvents. It dyes fats, waxes and lacquers pure yellow tints of very good fastness to sublimation. The dyestuff has a hydrophobic character, that is to say, the dyestuff itself and material dyed or impregnated therewith exhibit water-repellent properties.

The following table gives a few further dyestuffs which can be made by the procedure described in this example:

cent strength and 25 parts of sodium carbonate in 300 parts of water. Coupling is finished in a short time. The whole is stirred for 3 hours at room temperature,

*Table VII*

| | Coupling Component | Diazo Component | Esterifying Alcohol | Color of solution in benzene |
|---|---|---|---|---|
| 1 | 1-phenyl-3-methyl-5-pyrazolone-4'-carboxylic acid. | 3-nitro-4-aminobenzoic acid | Amyl alcohol | yellow. |
| 2 | ——do—— | 4-chloro-3-aminobenzoic acid | n-hexyl alcohol | Do. |
| 3 | 1-phenyl-5-pyrazolone-3-carboxylic acid ethyl ester. | 3-nitro-4-aminobenzoic acid | ——do—— | reddish yellow. |
| 4 | 1-phenyl-3-methyl-5-pyrazolone-4'-carboxylic acid. | 2-aminobenzoic acid ethyl ester. | cyclohexyl alcohol | Do. |
| 5 | 1-(2'-chloro)-phenyl-3-methyl-5-pyrazolone. | 4-methoxy-3-aminobenzoic acid. | nonyl alcohol | pure yellow. |
| 6 | ——do—— | 4-chloro-3-aminobenzoic acid. | ——do—— | yellow. |
| 7 | ——do—— | 3-nitro-4-aminobenzoic acid | ——do—— | greenish yellow. |
| 8 | ——do—— | 4-methoxy-3-aminophenyl acetic acid. | ——do—— | yellow. |
| 9 | ——do—— | 4-chloro-2-aminophenoxy-acetic acid. | dodecyl alcohol | Do. |
| 10 | ——do—— | 2-aminobenzoic acid | nonyl alcohol | greenish yellow. |
| 11 | 1-phenyl-3-methyl-5-pyrazolone. | 3-aminobenzoic acid | ——do—— | yellow. |
| 12 | ——do—— | 4-aminobenzoic acid | cetyl alcohol | Do. |

EXAMPLE 7

30.7 parts of 3-amino-4-methoxy-phenylacetic acid nonyl ester (boiling at 193–195° C. under 0.3 mm. pressure, and obtained by the hydrolysis and simultaneous esterification of 3-nitro-4-methoxy-phenyl acetic acid nitrile with concentrated sulfuric acid and nonyl alcohol, or obtained by reacting 3-nitro-4-methoxy-phenylacetic acid chloride with nonyl alcohol followed by reduction of the nitro-ester in alcohol with iron) are stirred with 25 parts of hydrochloric acid of 30 percent strength, and the mixture is cooled to 0° C. by the addition of ice. The hydrochloride separates in the form of a wax-like white body. 25 parts by volume of a 4 N-solution of sodium nitrite are run in, while stirring and cooling, at 0° C. in the course of 15 minutes. A clear slightly yellowish solution of the diazonium salt is obtained. It is stirred for a further 15 minutes at 0° C., and then the solution is run into a mixture, cooled to 0° C., of 20.5 parts of 6-acetylamino-2-hydroxynaphthalene, 10 parts by volume of sodium hydroxide solution of 30 per-filtered, and the filter residue is washed with water until the washings are colorless. By recrystallization from ethyl alcohol the dyestuff of the formula

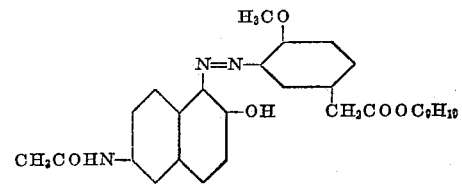

is obtained in the form of orange-red crystals. The dyestuff dissolves in concentrated sulfuric acid with a purple-red coloration and in organic solvents with a scarlet red coloration. It is suitable more especially for dying fats, waxes and lacquers.

In the following table are given a few further dyestuffs which can be made by the procedure described in this example. The diazo-components can be obtained as described at the beginning of this example:

*Table VIII*

| | Coupling Component | Diazo Component | Color of solution in benzene |
|---|---|---|---|
| 1 | 8-carbethoxyamino-2-hydroxynaphthalene | 4-aminobenzoic acid nonyl ester | scarlet. |
| 2 | ——do—— | 4-methoxy-3-aminobenzoic acid nonyl ester | red. |
| 3 | ——do—— | 4-methoxy-3-aminophenyl-acetic acid nonyl ester | bluish red. |
| 4 | 8-butyrylamino-2-hydroxynaphthalene | 2-aminobenzoic acid dodecyl ester | red orange. |
| 5 | ——do—— | 3-aminobenzoic acid nonyl ester | red. |
| 6 | ——do—— | 4-methoxy-3-amino-phenyl-acetic acid nonyl ester. | bluish red. |
| 7 | 8-acetylamino-2-hydroxynaphthalene | ——do—— | blue red. |
| 8 | 5-8-dichloro-1-hydroxynaphthalene | ——do—— | red orange. |
| 9 | 2-hydroxynaphthalene-3-carboxylic acid morpholide. | ——do—— | orange. |
| 10 | 1-hydroxynaphthyl(4)-acetyl ketone | ——do—— | Do. |
| 11 | 1-hydroxynaphthyl(4)-phenyl ketone | ——do—— | red orange. |
| 12 | 1-3-dihydroxybenzene | 4-chloro-3-aminobenzoic acid nonyl ester | brown orange. |
| 13 | 2-hydroxynaphthalene | 4-aminobenzoic acid nonyl ester | orange. |
| 14 | ——do—— | 2-aminobenzoic acid nonyl ester | yellow orange. |
| 15 | ——do—— | 4-methoxy-3-aminobenzoic acid amyl ester | red orange. |
| 16 | 6-bromo-2-hydroxynaphthalene | 4-chloro-3-aminobenzoic acid heptyl ester | scarlet red. |
| 17 | 6-methoxy-2-hydroxynaphthalene | 4-methoxy-3-aminobenzoic acid octyl ester | bluish red. |
| 18 | 5-8-dichloro-1-hydroxynaphthalene | 4-aminobenzoic acid-2'-ethyl hexyl ester | red. |
| 19 | 1-hydroxynaphthalene | 4-methoxy-3-aminophenyl-acetic acid nonyl ester | red orange. |
| 20 | 3-methyl-5-pyrazolone | 4-aminobenzoic acid hexyl ester | reddish yellow. |
| 21 | 1-phenyl-3-methyl-5-pyrazolone | 4-aminobenzoic acid nonyl ester | greenish yellow. |
| 22 | 1-(2'-chlorophenyl)-3-methyl-5-pyrazolone | 4-chloro-3-aminobenzoic acid nonyl ester | yellow. |
| 23 | 1-acetoacetylamino-2-chlorobenzene | 4-methoxy-3-amino-phenyl-acetic acid nonyl ester | greenish yellow. |
| 24 | 4-chloro-2-5-dimethoxy-1-acetoacetylamino-benzene. | 3-aminobenzoic acid amyl ester | yellow. |

EXAMPLE 8

34.5 parts of the azo dyestuff from diazotized 5-chloro-2-methyl-1-aminobenzene and 2,3-hydroxynaphthoic acid are stirred in 300 parts of N-nonyl alcohol with 2 parts of concentrated sulfuric acid and heated for 2 hours at 150–155° C., the dyestuff dissolving. On cooling, the nonyl ester crystallizes in brilliant red crystals. The whole is stirred for 2 hours at 0–5° C., suction-filtered and washed with methyl alcohol. There is obtained the dyestuff of the formula

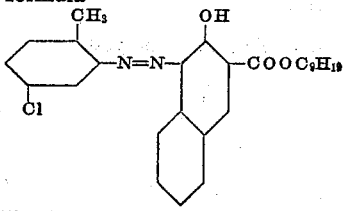

On recrystallization from a mixture of benzene and petroleum ether the dyestuff is obtained in the form of small brilliant red needles which melt at 122–124° C. It dissolves easily in benzene hydrocarbons, is readily soluble in acetone and esters, such as butyl acetate etc.

This dyestuff can also be obtained when corresponding quantities of the dyestuff from 5-chloro-2-methyl-1-aminobenzene and 2,3-hydroxynaphthoic acid methyl ester are used as starting material in this example.

EXAMPLE 9

500 parts of dyestuff No. 21 in Table II above are dissolved in 1000 parts by volume of boiling benzene, and the solution is then cooled. A clear solution so obtained was allowed to stand for 8 days at room temperature without any precipitation being formed. The solution can be used as a stock solution for various purposes, for example, for preparing impregnating solutions (see Example 10) or for dyeing oils, fats or waxes.

EXAMPLE 10

Crepe paper is impregnated with a solution of 1 percent strength in benzene of a dyestuff of the invention, which contains at least one carboxylic acid ester group of which the alcohol residue contains 8 or more carbon atoms. The paper is then dried in air. There may be used, for example, the following dyestuffs: Table I, Nos. 4, 5, 7, 8, 9 and 10; Table IV, Nos. 3, 4, 6, 11 and 13; and Table V, No. 13. The paper so treated has a considerably lower water absorption than the untreated paper. The water-repellent effect of impregnations produced with solutions of these dyestuffs is of the same order as that produced by treatment with an ordinary commercial paraffin wax emulsion suitable for imparting a water-repellent effect.

EXAMPLE 11

20 parts of the dyestuff No. 2 of Table VIII are dissolved in a printing color suitable for printing paper by the rotary intaglio printing process and containing 50 parts of a modified melamine resin, 25 parts of toluene and 25 parts of benzene. With this preparation strong bluish red prints can be produced on paper, and the prints are distinguished by their very good fastness to sublimation.

EXAMPLE 12

An ordinary commercial lacquer containing 114 parts of nitrocellulose, 48 parts of a melamine resin, 76 parts of an alkyd resin, 62 parts of dibutyl phthalate, 300 parts of butyl acetate and 320 parts of toluene, is dyed with 3 parts of the dyestuff No. 6 of Table III. By applying the lacquer to an aluminum foil by means of a film coating apparatus to give a coating 0.2 mm. thick, a strong red transparent coloration is produced.

EXAMPLE 13

The dyestuff No. 4 of Table IV is dissolved in acetone, and the solution is added to an acetone spinning solution of acetyl-cellulose, so that at an acetylcellulose content of 22 percent, the content of dyestuff is 1 percent calculated on the acetyl-cellulose. The spinning solution is extruded in the usual manner through jets into a heated drying shaft, whereby scarlet red filaments are produced.

EXAMPLE 14

60 parts of the dyestuff No. 10 of Table VII are dissolved in 320 parts of a solution of 2 percent of polyethylene in Tetralin, while heating the mixture on a water bath, and then the following two additions are made to the solution:

(a) 310 parts of a solution of 70 percent strength in toluene of the ethylene oxide derivative (see Swiss Patent No. 284,090, Example 1, 4th paragraph) which is obtained in the following manner: 228 parts (1 mol) of di-(4-hydroxy-phenyl)-dimethyl-methane are reacted with 148 parts (1.6 mols) of epichlorhydrin in an aqueous solution of sodium hydroxide, and the product is washed and dried.

(b) 310 parts of a glycide ether obtained as follows: 62 parts of ethylene glycol (1 mol) and 370 parts of epichlorhydrin (4 mols) are heated at 70° C. in a flask fitted with stirring mechanism and a reflux condenser. 80 parts of powdered sodium hydroxide (2 mols) are then added in 14 portions in the course of one hour, and the temperature of the mixture is maintained at 70–75° C. by external cooling. The excess of epichlorhydrin is then removed in vacuo, the residue is stirred with monochlorobenzene, the mixture is filtered with suction, and the filter residue is washed with the last mentioned solvent. The filtrate is evaporated in vacuo at 80–120° C. There are obtained 167 parts of a liquid yellow product having a content of 4.78 epoxide equivalents per kilogram. After thorough mixing, the whole is ground as finely as possible in a funnel mill.

To the 1000 parts of yellow printing color so prepared are added 52 parts of triethylene tetramine. This printing color when printed on polyethylene foils with a silk gauze stencil and hardened at 95–100° C. for 30 minutes, yields transparent elastic yellow prints which are very fast to rubbing, have a good fastness to light and a very good adhesion.

EXAMPLE 15

In the manner described in the preceding example the following printing color is prepared:

40 parts of the dyestuff No. 10 of Table IV
330 parts of a Tetralin solution containing 2 percent of polyethylene
630 parts of the solution described under (a) in Example 14.

1000 parts

For printing 42 parts of triethylene tetramine are added. This printing color when printed on polyvinyl chloride foils by roller printing with the use of shallow engraved rollers yields orange transparent effects, which after being dried at 60° C. for 30 minutes are distinguished by their very good adhesion, good fastness to light and washing.

EXAMPLE 16

In the manner described in Example 14 the following printing color is prepared:

80 parts of the dyestuff No. 14 of Table V
320 parts of a Tetralin solution containing 2 percent of polyethylene,
300 parts of the solution described under (a) in Example 14,
300 parts of the glycide ether described under (b) in Example 14, 1000 parts Before printing 42 parts of triethylene tetramine are added. When this printing color is printed on waterproof foils of acetyl-cellulose in a pattern having fine outlines by screen printing there is obtained after drying for 30 minutes at 60° C. a sharp transparent red pattern of good fastness to light, which is flexible and cannot be scratched by the fingernails.

What is claimed is:

1. A fat-soluble mono-azo-dyestuff free from water-solubilizing groups and corresponding to the formula

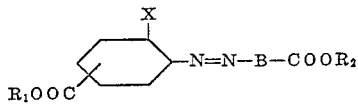

in which X represents a member selected from the group consisting of hydrogen, chlorine, nitro and methoxy, B represents a member selected from the group consisting of the 2-hydroxy-naphthalene radical bound in 1-position to the azo-group and in 3-position to the carboxylic acid ester group and the acetoacetyl-anilide and the 1-phenyl-3-methyl-5-pyrazolone radicals bound in 4-position to the azo-linkage and in the phenyl radical to the carboxylic acid ester group, and $R_1$ and $R_2$ each represents an alkyl radical having a maximum of 18 carbon atoms, at least one of these alkyl radicals having at least 8 carbon atoms.

2. The fat-soluble mono-azo-dyestuff of the formula

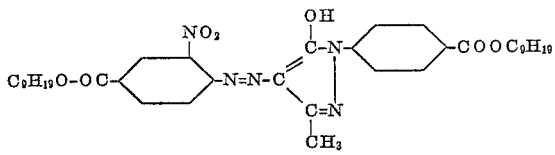

3. The fat-soluble monoazo-dyestuff of the formula

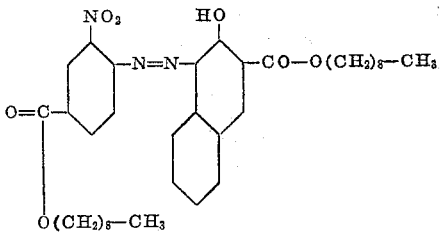

4. The fat-soluble monoazo-dyestuff of the formula

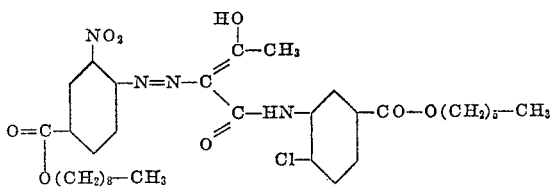

References Cited in the file of this patent

UNITED STATES PATENTS

| | | |
|---|---|---|
| 2,019,914 | Kracker | Nov. 5, 1935 |
| 2,155,493 | Knight et al. | Apr. 25, 1939 |
| 2,393,652 | Olpin et al. | Jan. 29, 1946 |
| 2,634,262 | Piepenbrink et al. | Apr. 7, 1953 |
| 2,750,378 | Fischer | June 12, 1956 |

FOREIGN PATENTS

| | | |
|---|---|---|
| 559,272 | Germany | Sept. 17, 1932 |
| 512,519 | Belgium | July 15, 1952 |